United States Patent
Kodama et al.

(10) Patent No.: US 11,039,974 B2
(45) Date of Patent: Jun. 22, 2021

(54) FULL OR PARTIAL BODY PHYSICAL FEEDBACK SYSTEM AND WEARABLE EXOSKELETON

(71) Applicant: Brave Virtual Worlds, LLC, McLean, VA (US)

(72) Inventors: William Sheng Kodama, McLean, VA (US); Dhyey Devang Parikh, Chantilly, VA (US); Evan Anders Magnusson, Boise, ID (US)

(73) Assignee: Brave Virtual Worlds, LLC, McLean, VA (US)

( * ) Notice: Subject to any disclaimer, the term of this patent is extended or adjusted under 35 U.S.C. 154(b) by 0 days.

(21) Appl. No.: 16/797,603

(22) Filed: Feb. 21, 2020

(65) Prior Publication Data

US 2021/0030613 A1 Feb. 4, 2021

Related U.S. Application Data

(60) Provisional application No. 62/881,590, filed on Aug. 1, 2019.

(51) Int. Cl.
*A61H 3/00* (2006.01)
*G06F 3/01* (2006.01)

(52) U.S. Cl.
CPC .............. *A61H 3/00* (2013.01); *G06F 3/011* (2013.01); *G06F 3/016* (2013.01);
(Continued)

(58) Field of Classification Search
CPC ........ A61H 3/00; A61H 1/0244; A63B 21/02; B25J 9/006
See application file for complete search history.

(56) References Cited

U.S. PATENT DOCUMENTS

| 7,409,882 B2 | 8/2008 | Massimo et al. |
| 9,072,941 B2 | 7/2015 | Duda et al. |

(Continued)

FOREIGN PATENT DOCUMENTS

| CA | 3047714 A1 | 12/2017 |
| CN | 206703005 U | 4/2017 |

(Continued)

OTHER PUBLICATIONS

Rosen, J., Perry, J., Manning, N., Burns, S., & Hannaford, B. (2005). The human arm kinematics and dynamics during daily activities—toward a 7 DOF upper limb powered exoskeleton. ICAR 05. Proceedings., 12th International Conference on Advanced Robotics, 2005. doi: 10.1109/icar.2005.1507460.

(Continued)

*Primary Examiner* — Jason-Dennis N Stewart
(74) *Attorney, Agent, or Firm* — Woods Rogers PLC; Nathan A. Evans

(57) ABSTRACT

A wearable exoskeleton with full or partial body physical feedback system in virtual and augmented reality applications, or in physical fitness applications, including, in aspects, finger, hand, wrist, elbow, shoulder, back, hip, knee, ankle, and foot components, or combinations thereof. The system implements physical feedback, using resistive or restrictive forces, for both the upper and lower portions of the human body. Additionally, the wearable exoskeleton and system are capable of being configured for particular applications including but not limited to virtual and augmented reality, as well as physical fitness and physical therapy applications.

20 Claims, 14 Drawing Sheets

(52) U.S. Cl.
CPC ........... *A61H 2201/0107* (2013.01); *A61H 2201/1246* (2013.01); *A61H 2201/1659* (2013.01); *A61H 2201/1671* (2013.01); *A61H 2201/1676* (2013.01); *A61H 2201/5007* (2013.01); *A61H 2201/5012* (2013.01); *A61H 2201/5043* (2013.01); *A61H 2201/5061* (2013.01); *A61H 2201/5084* (2013.01)

(56) References Cited

U.S. PATENT DOCUMENTS

| | | | |
|---|---|---|---|
| 9,158,376 | B2 | 10/2015 | Kazerooni et al. |
| 9,427,864 | B2 | 8/2016 | Kornbluh et al. |
| 9,582,072 | B2 | 2/2017 | Connor |
| 9,588,582 | B2 | 3/2017 | Connor et al. |
| 9,652,037 | B2 | 5/2017 | Rubin et al. |
| 9,782,322 | B2 | 10/2017 | Nagarajan et al. |
| 9,872,782 | B2 | 1/2018 | Herr et al. |
| 9,904,358 | B2 | 2/2018 | Rubin et al. |
| 9,950,422 | B2 | 4/2018 | Kornbluh et al. |
| 9,996,153 | B1 | 6/2018 | Trotta |
| 10,016,332 | B2 | 7/2018 | Aguirre-Ollinger et al. |
| 10,105,839 | B2 | 10/2018 | Kornbluh et al. |
| 10,137,011 | B2 | 11/2018 | Herr et al. |
| 10,222,859 | B2 | 3/2019 | Rubin et al. |
| 10,248,201 | B2 | 4/2019 | Hawkes et al. |
| 10,278,883 | B2 | 5/2019 | Walsh et al. |
| 10,285,765 | B2 | 5/2019 | Sachs et al. |
| 10,285,828 | B2 | 5/2019 | Herr et al. |
| 10,285,843 | B2 | 5/2019 | Yangyuenthanasan et al. |
| 10,423,227 | B2 | 9/2019 | Gu |
| 2007/0135279 | A1* | 6/2007 | Purdy ............ A63B 21/4005 482/124 |
| 2008/0009771 | A1 | 1/2008 | Perry et al. |
| 2013/0040783 | A1* | 2/2013 | Duda ............ A63B 23/03575 482/9 |
| 2015/0266180 | A1* | 9/2015 | Kornbluh ............ B25J 9/1615 700/260 |
| 2015/0321339 | A1* | 11/2015 | Asbeck ............ B25J 9/0006 414/7 |
| 2017/0281385 | A1* | 10/2017 | Angold ............ A61F 5/0102 |
| 2019/0176320 | A1 | 6/2019 | Smith et al. |
| 2019/0183715 | A1 | 6/2019 | Kapure et al. |
| 2019/0336381 | A1 | 11/2019 | Koltzi et al. |
| 2020/0009719 | A1 | 1/2020 | Scattareggia Marchese et al. |

FOREIGN PATENT DOCUMENTS

| | | |
|---|---|---|
| DE | 102017220996 A1 | 11/2017 |
| KR | 101548156 B1 | 2/2014 |
| KR | 1020140131175 | 11/2014 |
| WO | 2019232997 A1 | 12/2019 |

OTHER PUBLICATIONS

Walsh, C., Paluska, D., Pasch, K., Grand, W., Valiente, A., & Herr, H. (2006). Development of a lightweight, underactuated exoskeleton for load-carrying augmentation. Proceedings 2006 IEEE International Conference on Robotics and Automation, 2006. ICRA 2006. doi: 10.1109/robot.2006.1642234.

Cui, L., Phan, A., & Allison, G. (2015). Design and fabrication of a three dimensional printable non-assembly articulated hand exoskeleton for rehabilitation. 2015 37th Annual International Conference of the IEEE Engineering in Medicine and Biology Society (EMBC). doi: 10.1109/embc.2015.7319425.

Sutapun, A., & Sangveraphunsiri, V. (2015). A 4-DOF Upper Limb Exoskeleton for Stroke Rehabilitation: Kinematics Mechanics and Control. International Journal of Mechanical Engineering and Robotics Research. doi: 10.18178/jmerr.4.3.269-272.

Wege, A., & Hommel, G. (2005). Development and control of a hand exoskeleton for rehabilitation of hand injuries. 2005 IEEE/RSJ International Conference on Intelligent Robots and Systems. doi: 10.1109/iros.2005.1545506.

Koyama, T., Yamano, I., Takemura, K, & Maeno, T. (2002). Multi-fingered exoskeleton haptic device using passive force feedback for dexterous teleoperation. IEEE/RSJ International Conference on Intelligent Robots and System. doi: 10.1109/irds.2002.1041713.

Perry, J. C., Rosen, J., & Burns, S. (2007). Upper-Limb Powered Exoskeleton Design. IEEE/ASME Transactions on Mechatronics, 12(4), 408-417. doi: 10.1109/tmech.2007.901934.

McNeely, W. (1993). Robotic graphics: a new approach to force feedback for virtual reality. Proceedings of IEEE Virtual Reality Annual International Symposium. doi: 10.1109/vrais.1993.380761.

Iwata, H. (1993). Pen-based haptic virtual environment. Proceedings of IEEE Virtual Reality Annual International Symposium. doi: 10.1109/vrais.1993.380767.

Azmandian, M., Hancock, M., Benko, H., Ofek, E., & Wilson, A. D. (2016). A Demonstration of Haptic Retargeting. Proceedings of the 2016 ACM on Interactive Surfaces and Spaces—ISS 16. doi: 10.1145/2992154.2996883.

Frisoli, A., Salsedo, F., Bergamasco, M., Rossi, B., & Carboncini, M. C. (2009). A force-feedback exoskeleton for upper-limb rehabilitation in virtual reality. Applied Bionics and Biomechanics, 6(2), 115-126. doi: 10.1080/11762320902959250.

Gupta, A., & O'Malley, M. K. (2004). Design of a Haptic Arm Exoskeleton for Training and Rehabilitation. Dynamic Systems and Control, Parts A and B. doi: 10.1115/imece2004-59353.

Gopura, R. A. R. C., & Kiguchi, K. (2009). Mechanical designs of active upper-limb exoskeleton robots: State-of-the-art and design difficulties. 2009 IEEE International Conference on Rehabilitation Robotics. doi: 10.1109/corr.2009.5209630.

Meyen, F. (n.d.). Qualifying Exam Research Presentation.

PCT Search Report and Written Opinion in counterpart case PCT/US2020/043957 dated Oct. 20, 2020 (10 pages).

\* cited by examiner

FULL OR PARTIAL BODY PHYSICAL FEEDBACK SYSTEM AND WEARABLE EXOSKELETON

CROSS-REFERENCE TO RELATED APPLICATIONS

The present application relies on the disclosures of and claims priority to and the benefit of the filing date of U.S. Provisional Application No. 62/881,590, filed Aug. 1, 2019. The disclosures of that application are hereby incorporated by reference herein in their entireties.

BACKGROUND OF THE INVENTION

Field of the Invention

The present invention relates generally to an apparatus and method for providing resistance and restriction, which can, in aspects, be in response to virtual- and/or augmented-reality interactions and environments. In other aspects, by way of example only, it can be used in physical therapy, fitness, and general user wellness applications.

Therefore, the present invention and the physical feedback system for the human body described herein can be used in fields including but not limited to virtual reality, augmented reality, mixed reality, enhanced reality, simulations, gaming, education, telepresence, entertainment, training and development, training skills, design, architecture, art, computer-aided design, physical therapy, athletics, fitness, control systems, controlling vehicles, simulating controlling vehicles, surgery, military training, astronaut training, space exploration, and any other applicable fields or combinations thereof.

Description of Related Art

Wearable technology is a category of electronic devices that can be worn as accessories providing hand-free capabilities and sending/receiving data via the Internet. From the invention of eyeglasses to smartwatches, wearable technologies have continued to dominate the consumer marketspace. Over the past few years there has been a shift to more specialized and practical applications for such technologies. These include virtual- and augmented-reality, physical therapy, fitness, and general user wellness.

One particular specialized area of wearable technology adoption can be found in virtual- and augmented-reality systems. Virtual reality systems are computer-based systems comprising generally of a headset (head-mounted device), controllers, and/or lighthouses that enables the viewing of a three-dimensional virtual world. Currently, a major focus has been on how a participant or user interacts with the virtual world to either influence or receive feedback from virtual objects. There has been a need for a full-body immersive experience in virtual and augmented reality that can truly immerse the user into a virtual environment beyond only visual and auditory cues. This need is apparent in all use cases of virtual and augmented reality and in all simulation-based endeavors that involve a user interacting with virtual space. Virtual space may include any virtual objects, virtual environments, or virtual beings that represent a real composition of matter (of which physics apply to and therefore supplies a normal force) in a three-dimensional virtual world. A full-body immersive experience can help reduce the imitation felt by virtual objects by dispersing the notion of being in a virtual space. By doing so, entertainment and training would be improved, such as sports, martial arts, and military training. Forces would be simulated as when participating in combat with an enemy or feeling the impact of the ball on a tennis racquet when swinging it. Providing immersive physical feedback would also improve and open doors for design and professional digital applications by allowing the user to interact with their work beyond visual and auditory cues. The integration of a full-body immersive experience in virtual or augmented reality is not only restricted by the current haptic technology, but also by robotic suits, exoskeletons, and biomechanical approaches, as well.

Current human-computer interface devices do not sufficiently achieve the long-felt but unsolved need of enabling immersive interactions with a computerized environment, and previous attempts by others have mostly been failures. A summary of known devices and the existing state-of-the-art having at least one of the following key performance deficiencies or shortcomings, among others, includes:

Haptic/Pressure Based Feedback:

Previous attempts based on a human-computer interface system relaying haptic and/or pressure to the user fall short in that these designs attempt to simulate the feeling of touch with direct force application, whereas the current invention uses restriction mechanisms to restrict the user's range of motion, thereby providing a more immersive perception of touching an object. The current invention is also inherently safer as it does not directly apply forces to the user, rather the biomedical-electromechanical exoskeletal brace can lock up or restrict movement when a user begins pseudo-physical contact in virtual space or biomimetic resistance training.

Augmentation Versus Resistance:

Previous attempts based on adaptive resistance to movement involve multiple actuators moving based on processed information from multiple sensors, whereas the approach in the current invention immerses the user in virtual reality through resistance that an exoskeleton provides, which is prompted by the user's virtual position in a virtual environment. Tracking of the human body, in aspects, is processed in the virtual world, which dictates the feedback an exoskeleton provides. Furthermore, attempts have focused on augmenting a user's range of motion which does not take into account real-life interactions between a user and surrounding objects. A resistance based system provides the user real feedback that can be critical to patients in physical therapy for recovering optimal mobility or provide an accurate response to virtual reality users.

Perception Versus Sensation:

Previous attempts were based on implementing sensory feedback in virtual reality by involving the use of pressure based sensors or haptic feedback to specific locations on the body. Other ideas focused on imitating touch in a visual space where a participant is able to feel the textures of virtual objects. The problem with those attempts arises of a disconnect between real and virtual where the participant knows that an object is there but still cannot seem to actually hold it or grasp onto it. Instead, they still can go right through the object even though their mind knows that it is really there through sight and touch. This can cause simulation sickness or mild headaches in some users which ends up deterring them from further pursuing different content in virtual and augmented reality. The approach of the current invention is different in that, in aspects, it focuses on the perception of virtual objects which involves the way a participant is able to interact with them, such as pushing, pulling, grasping, etc. Through an indirect resistive force, for example, the current invention can imitate these actions to bring forth perception in virtual reality or when there is a lack of a rigid object.

Bulky, Heavy, Non-Portable, and Intrusive:

Previous attempts to create a virtual reality suit or wearable exoskeleton that provides accurate biomimetics have foregone practicality for functionality, with large appendages or systems attached to apply enough force to supplement a participant. Such approaches to provide immersion or resistance in virtual reality interfere with the overall virtual experience. The current invention allows for a compact and portable system that does not lack with respect to the amount of force adequate to provide for mimicking human motion. This can be done through, in embodiments, electrical or mechanical aspects, without the need to have external attachments, in certain examples.

Limited Scope of Human Interaction:

Previous attempts to augment or limit human motion in a virtual setting have become hyper focused on only particular parts of the body. Approaches have created exoskeletons to limit the range of motion of only hands, for example, primarily on fingers. This limits the ability such approaches to fully mimic human motion systematically.

The approach in the current invention is, in embodiments, a full-body physical feedback system that can be modulated into upper-body, lower-body, or arm only sections. Either section may be more extensive than a singular body part, such as the hand, as true physical feedback limits the range of motion of a whole section of the body. The greater scope of human interaction allowed by the current invention ensures a more immersive experience with virtual reality and provides adequate resistance for mimicking human motion.

Overall, the currently-available approaches are not practical because they either focus too much on one aspect of human interaction with virtual objects or are simply uneconomical. Furthermore, they do not take into account the psychological component of human interaction with objects which only make them deviate further from providing a fully immersive virtual experience or resistive capability for accurate biomimetic applications. Patents referenced herein include, but are not limited to: U.S. Pat. Nos. 9,072,941B2, 9,427,864B2, 9,652,037B2, 10,222,859B2, 10,423,227B2; of which these U.S. patents are hereby incorporated by reference in their entirety herein.

SUMMARY OF INVENTION

It is a general object of the present invention to provide a system and method providing physical feedback that can be used in, but is not limited to, a virtual reality environment, using a wearable exoskeleton that implements novel resistive and restrictive forces and methods.

It is another general object of the present invention to provide a novel exoskeletal frame design for ergonomic use in any portable, wearable exoskeleton, especially for use in conjunction with virtual and augmented reality applications and environments.

It is also an object of the invention to provide improved hinge joint systems for resisting and restricting joint movement, especially for hardware used in conjunction with virtual and augmented reality situations, applications, and environments.

Another broad object of the present invention is to provide an improved triaxial joint or rail system for resisting and restricting joint movement, including for hardware, especially wearable hardware, used in conjunction with virtual and augmented reality situations, applications, and environments. Relatedly, an additional object of the invention is to provide a feedback system that relies on frictional forces to resist and restrict motion.

A further object of the present invention is to provide a method of interfacing with virtual reality using an exoskeleton to provide physical feedback to a user.

Another object of the present invention is to provide data and to collect measurements using sensors that can then be analyzed and sorted. Additionally, these sensors can be used to passively collect data or can be used to provide data into a feedback loop to drive other systems within or outside the exoskeleton.

Another useful object of the present invention is to provide an indirect and passive force as the resistance and restriction of movement, thus causing a safer and functionally improved exoskeletal system to be used for wearable hardware in conjunction with virtual and augmented reality situations, applications, and environments.

Another object of the invention is to provide a tightening system that is multipurpose, accessible, and intuitive.

These objects and others are achieved, in a preferred embodiment of the present invention, by providing a variable physical feedback, using a wearable exoskeleton that interfaces with virtual reality. The physical feedback, in aspects, is an indirectly applied frictional force caused by a directly applied compressive force using an electromechanical system. By detecting the force needed from the simulation, the compressive force can be varied and controlled using an embedded system, thus, changing the resistive force. This system makes the exoskeleton system safe to use given that the maximum force that is applied onto the user's body is directly equivalent to the quantity of force the user applies themselves onto the suit.

BRIEF DESCRIPTION OF THE DRAWINGS

The accompanying drawings illustrate certain aspects of embodiments of the present invention and should not be used to limit the invention. Together with the written description the drawings explain certain principles of the invention.

DETAILED DESCRIPTION OF INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present invention can be described in terms of an aspect which is particularly useful in understanding the purpose and novelty of the present invention. Following this description, specific individual components of the design shown in FIG. 1, for example, are described herein.

Figure 4:
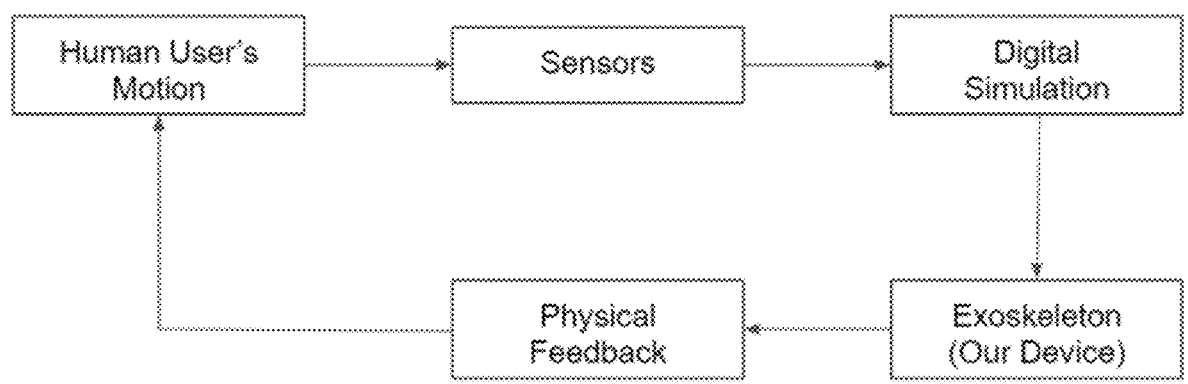
FIG. 4 is a flow diagram of the entire system and how the exoskeleton behaves and interacts with virtual reality, according to one embodiment of the present invention.
Figure 5:
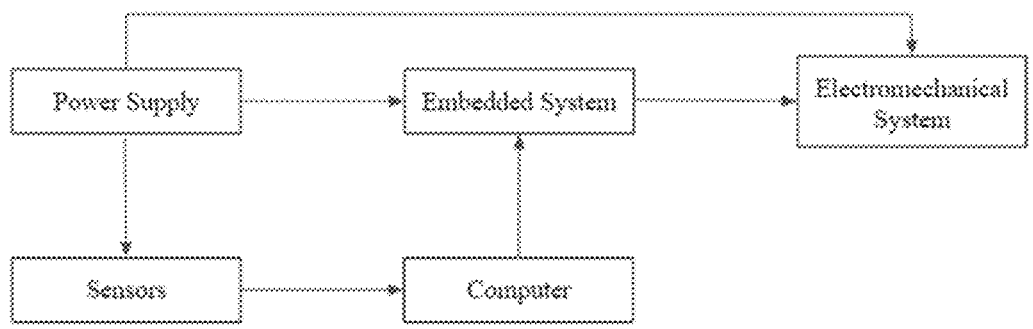
FIG. 5 a flow diagram of the electrical system of the invention, according to one embodiment of the present invention.

An embodiment of the present invention is shown in FIG. 4, which displays a general flow of how the user, simulation, and wearable exoskeleton interact with one another. The user's motions in the real world are captured by sensors or cameras, which are then transmitted and mirrored in the simulation. Interactions and feedback from the digital simulation are then sent to the exoskeleton in response to events. The exoskeleton then provides physical feedback to the user and the cycle continues. Additionally, sensors can be used with the invention to gather data and metrics from both the exoskeleton and user to be ported, transported, sent, and/or applied to software to be analyzed and sorted. These sensors can be placed both internally or externally around the invention and can be used to collect or transmit data. In addition, FIG. 5 displays a general flow of how the electrical system relates and flows into each other.

Figure 1:
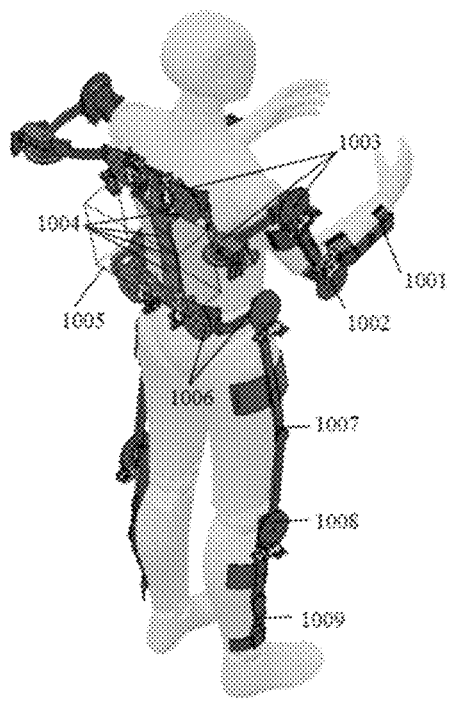
FIG. 1 is a perspective view of the full body exoskeleton frame for resisting or restricting the user's movements in virtual reality, according to one embodiment of the present invention.
Figure 2:
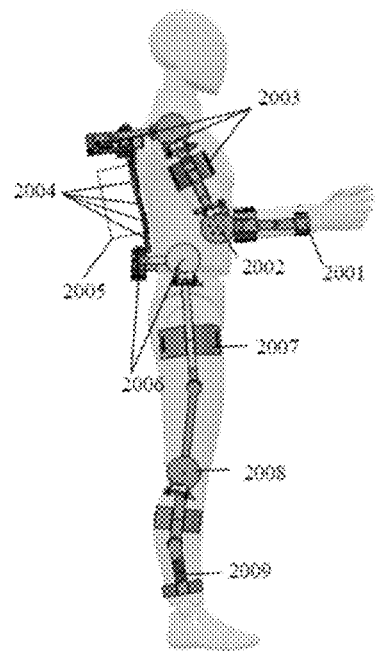
FIG. 2 is a side view of the full body exoskeleton frame for resisting or restricting the user's movements in virtual reality, according to one embodiment of the present invention.
Figure 3:
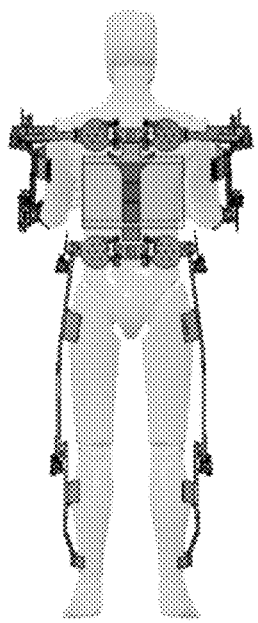
FIG. 3 is a back view of the full body exoskeleton frame for resisting or restricting the user's movements in virtual reality, according to one embodiment of the present invention.

Another embodiment of the present invention is displayed in FIG. 1, which shows an example of the full body wearable exoskeleton frame. As a note for this particular figure, the figure is labeled such that repeated and mirrored components of the present invention are assumed based on one half of the exoskeleton, but this is not a limitation since in embodiments one half of the suit can differ from the other half, and components may differ between body parts (e.g., one arm or hand of the exoskeleton may be configured different from another arm or hand). In the embodiment shown in FIG. 1, the exoskeleton is connected to the upper torso using a harness device that wraps around the front, back, and waist. The exoskeleton frame can be connected to body using bands and straps that wrap key components on the exoskeleton to the user. The frame of the exoskeleton can begin with a wrist system 1001 that can be used to resist and restrict the joints in the user's wrist and can be used as the foundation for finger resistance and restriction. Another system on the frame, in aspects, can be an elbow system 1002 that can utilize a hinge joint and physical feedback system in order to resist or restrict a user's range of motion along one or more axes. Another system on the exoskeleton frame can be a shoulder system 1003 that can mimic a user's triaxial range of motion, in aspects, on a joint with three degrees of freedom and can provide physical resistance and feedback in all three ranges of motion in a number of combinations and variations in feedback along each axis. Another system, in aspects, can be a back spinal system 1004 that can be a cascade of interconnected pieces that can provide support and structure for the exoskeleton, as well as provide resistance, restriction, or physical feedback. In addition, in aspects, a unit on the back of the user 1005 can be mounted onto the previously described back spinal system 1004 to contain or house the main parts of the electrical system, mechanical system, and/or power supply (wired or not wired). Another system on the exoskeleton, in aspects, is a hip joint triaxial system 1006 that provides a similar functionality as the shoulder system 1003 in which it provides the user's triaxial joint three ranges of motion on the exoskeleton frame and provides a controllable and variable physical resistance and feedback. The next system on the exoskeleton can be a knee system 1008 that can be a hinge system frame similar to the elbow system 1002 described previously to control and provide physical feedback system to a hinge joint on the user's body. The knee system can utilize a transitional piece 1007 that provides adjustability to account for varying curvature amongst users. The next system can be an ankle system 1009 that, in aspects, is similar to the previously-mentioned wrist system 1001 and provides feedback to the ankle. The other components of the system can be used to transition between systems on the user's body in order to account for varying user shape. Additionally, the frame can be a combination of rigid, semi-right, and/or and flexible materials that can be used with certain components described herein.

Figure 6:
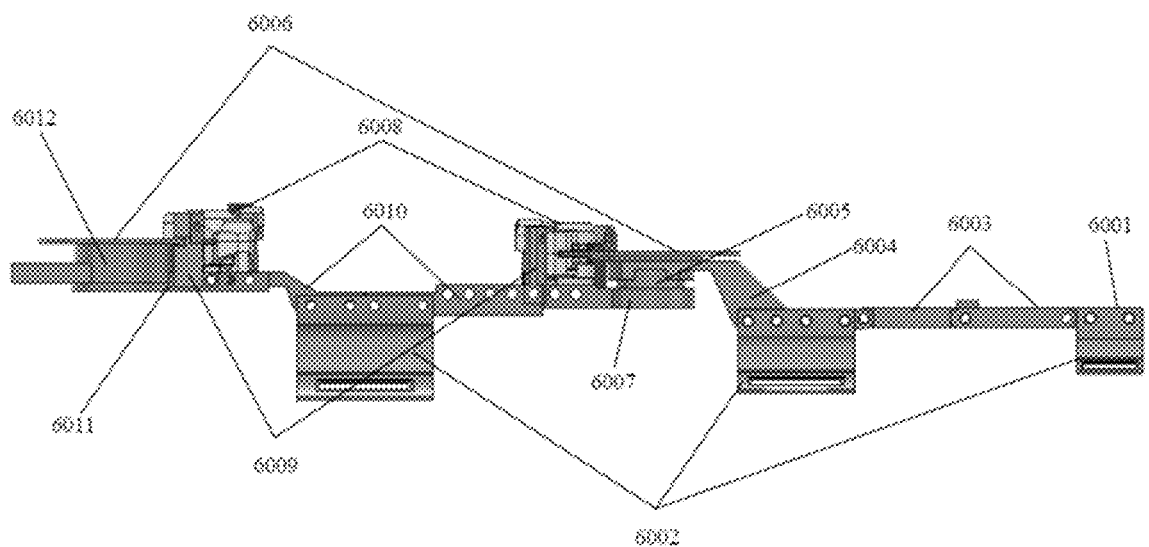
FIG. 6 is a side view of a hinge joint that can be used for elbow resistance or restriction with the exoskeleton frame for a person's arm, according to one embodiment of the present invention. The hinge design, in aspects, can be extrapolated or applied to the knee joint.
Figure 7:
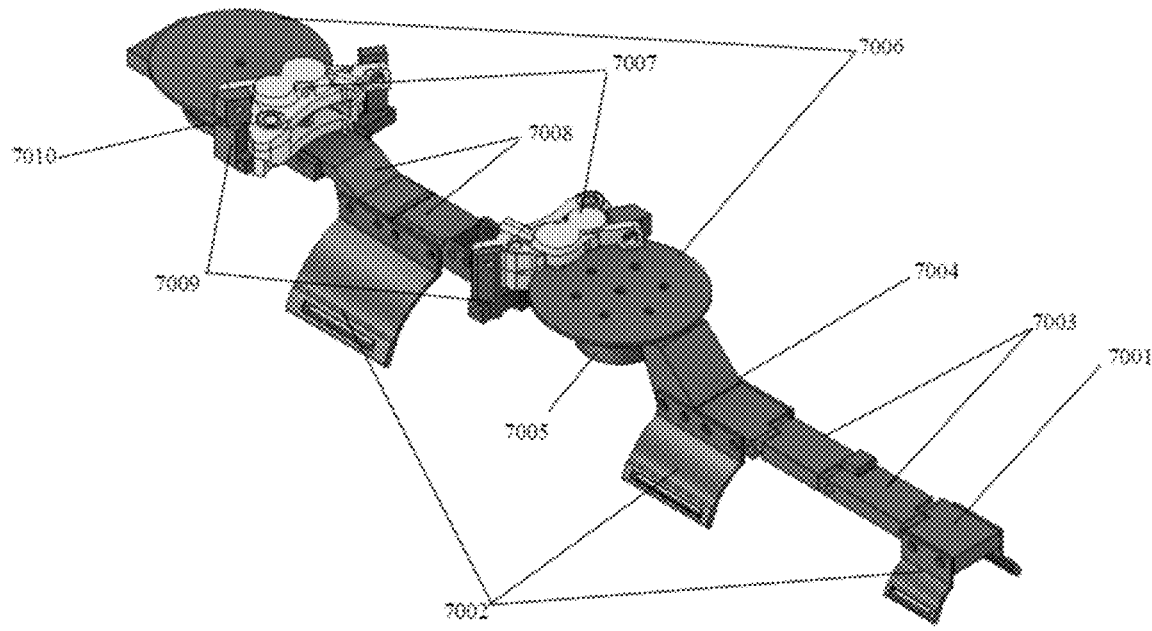
FIG. 7 is a perspective view of the hinge joint that can be used for elbow resistance or restriction with the exoskeleton frame for a person's arm, according to one embodiment of the present invention. The hinge design can be extrapolated or applied to the knee joint.
Figure 8:
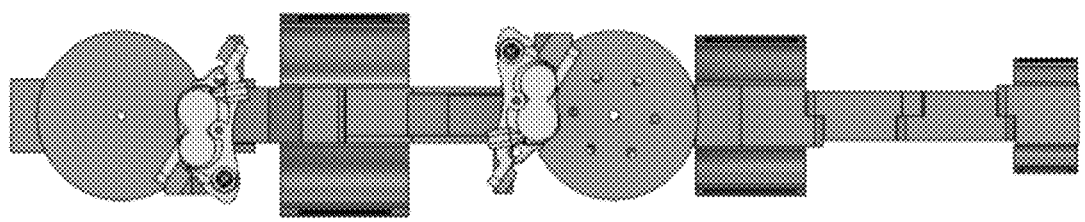
FIG. 8 is a top view of the hinge joint that can be used for elbow resistance or restriction with the exoskeleton frame for a person's arm, according to one embodiment of the present invention. The hinge design, in aspects, can be extrapolated or applied to the knee joint.

Another embodiment of the system is shown in FIG. 6, which shows the elbow portion of the device as a medium, in aspects, to provide resistive or restrictive forces for a hinge joint. The figure also includes transitional aspects for connecting this system to other exoskeletal systems. The system for the elbow comprises sub-components 6003 through 6010. Component 6003 connects the elbow system at 6004 to the wrist 6001. Across the entire system, connection components 6002 can be used to attach the system to the user. In aspects, metal discs 6006, in which the one on the right side of the figure is connected to component 6004, rotate along a pivot point which runs through the center components 6005 and 6007, which rotate independently of components 6004 and 6006. Component 6005 is, in aspects, a flexible, cylindrical piece that is able to compress and expand along its upright axis. The component 6007 connects to component 6010 that allows for adjustment in length or other aspects for different uses or users. Components comprising 6008 are brake calipers that can be used to clamp down on the metal discs to provide resistance and restriction on or to the joint. In embodiments, the calipers 6008 are connected to the exoskeleton connector pieces 6009. Components 6011 and 6012 are transitional pieces to a shoulder system that can be used together with the elbow system. In addition to FIG. 6 there are two other perspectives of the system in FIG. 7 and FIG. 8 to provide clarity and further explanation.

Figure 9:
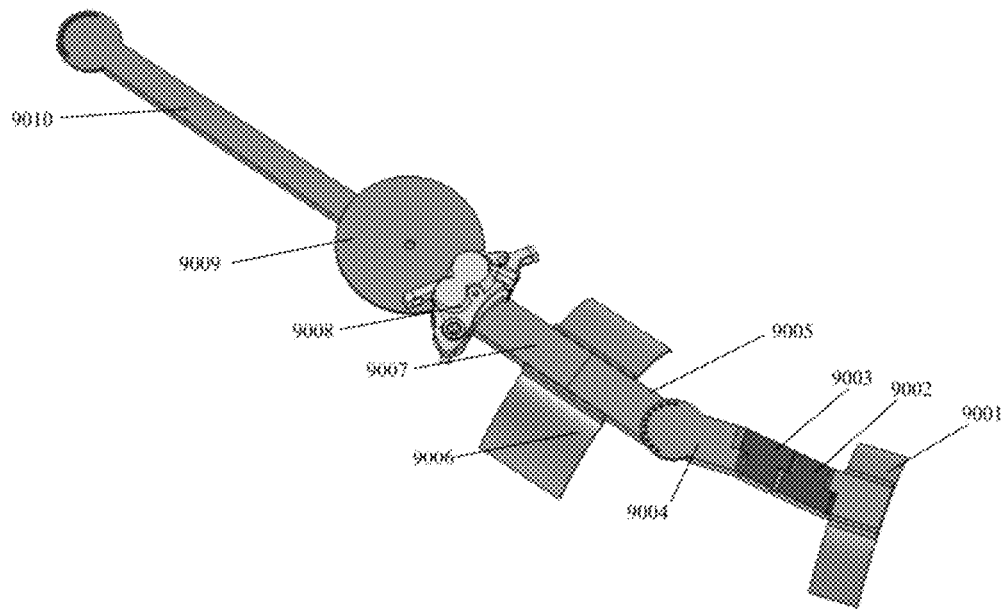
FIG. 9 is a perspective view of the hinge joint that can be used for knee resistance or restriction with the exoskeleton frame for a person's leg, according to one embodiment of the present invention. The hinge design can be extrapolated or applied, in aspects, to the elbow joint.
Figure 10:
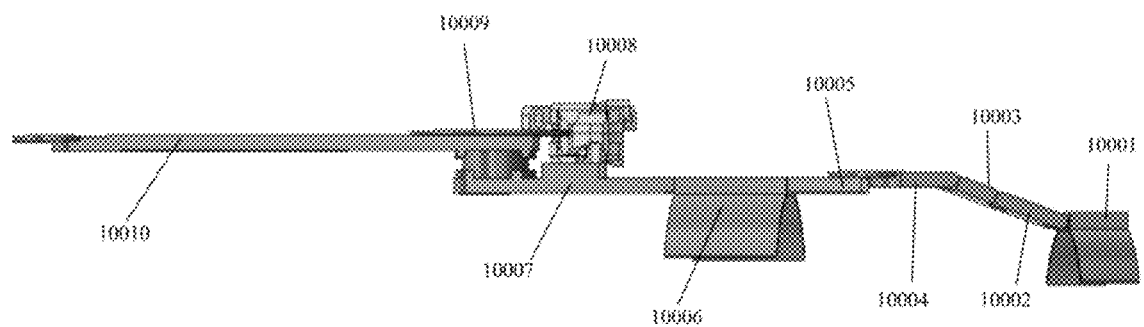
FIG. 10 is a side view of the hinge joint that can be used for knee resistance or restriction with the exoskeleton frame for a person's leg, according to one embodiment of the present invention. The hinge design, in aspects, can be extrapolated or applied to the elbow joint.

Another embodiment of the system is shown in FIG. 9 and FIG. 10, in which the knee exoskeleton elements and their connecting parts are shown to describe and show the resistive or restrictive method applied to the hinge joint. Similar to the elbow embodiment described above, components 9007 through 9010 can be used to enable and control a hinge joint restriction and resistive exoskeleton. Components 9007 and 9010 hinge around the same point, in aspects, and can be resisted or restricted using a braking system shown by the metal disc 9009 and brake caliper 9008. The transitional components from the main hinge joint can differ from the previous system by allowing for more adjustability and variation using pieces that hinge and rotate and can then be locked in position. Components 9002, 9003, and 9004 can be used together to vary the height and length at which the ankle band 9001 can be attached to the user in respect to the leg band 9006. Additionally, components 9004 and 9005 can be used together to adjust the angle at which the lower body exoskeleton follows or conforms to the user's leg curvature. Component 9010 can comprise these similar components mentioned previously and can be used with other pieces to provide the same functionality of adjusting the exoskeleton to fit the user's body.

Figure 11:
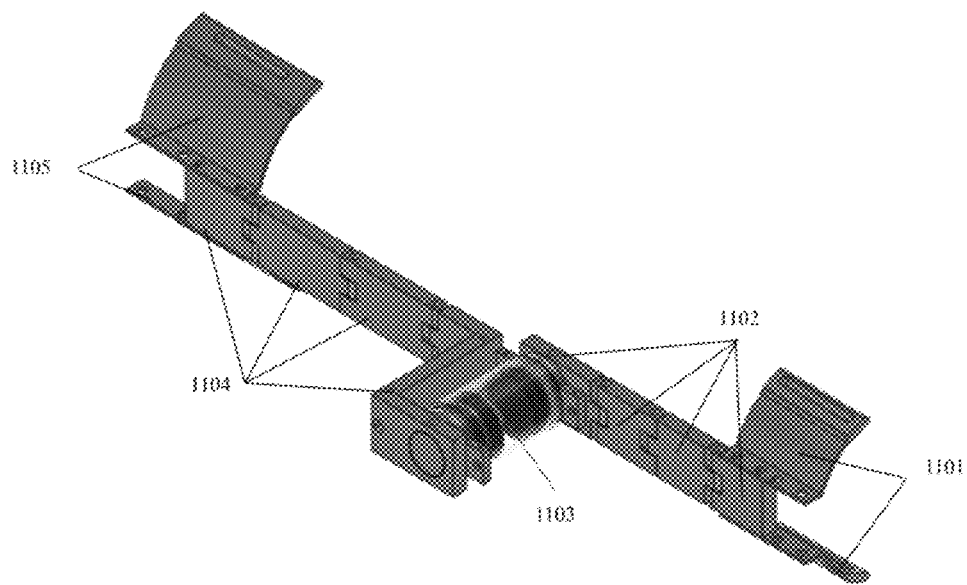
FIG. 11 is a perspective view of another hinge joint that can be used for elbow resistance or restriction with the exoskeleton frame for a person's arm, according to one embodiment of the present invention. The hinge design can be extrapolated or applied to the knee joint.
Figure 12:
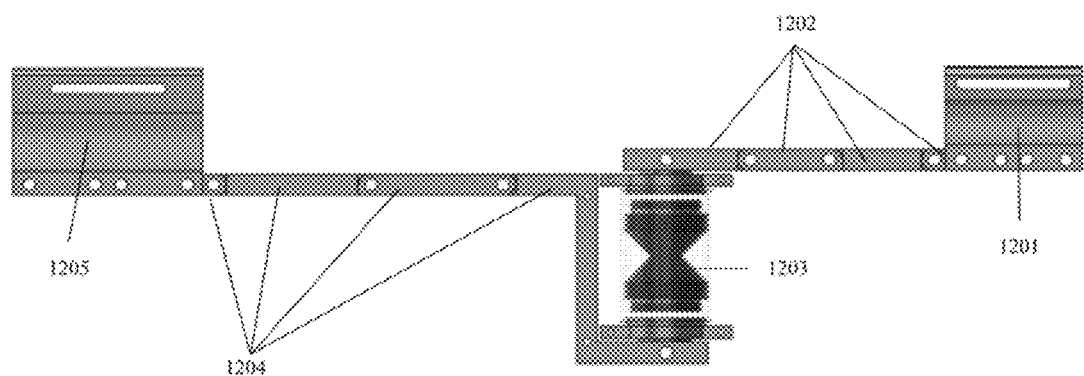
FIG. 12 is a side view of another hinge joint that can be used for elbow resistance or restriction with the exoskeleton frame for a person's arm, according to one embodiment of the present invention. The hinge design can be extrapolated or applied to the knee joint.
Figure 13:
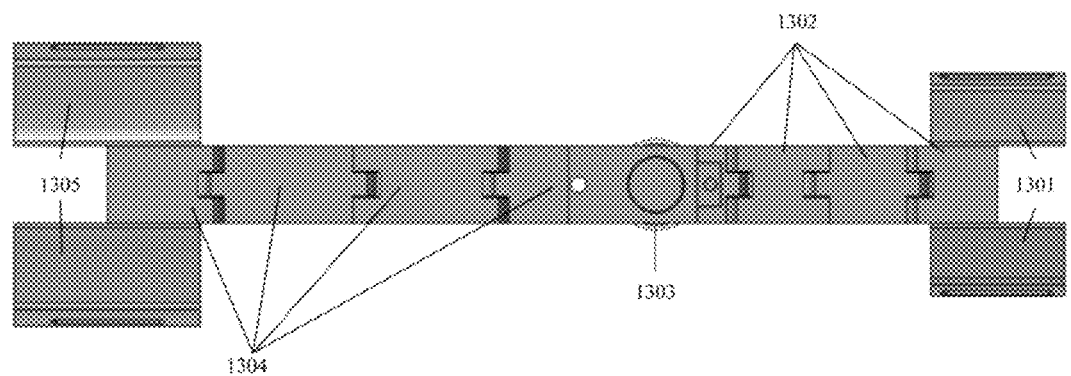
FIG. 13 is a top view of another hinge joint that can be used for elbow resistance or restriction with the exoskeleton frame for a person's arm, according to one embodiment of the present invention. The hinge design can be extrapolated or applied to the knee joint.

Another embodiment is the system shown in FIG. 11 in which another embodiment of the elbow exoskeleton elements and their connecting parts are shown to describe and show another resistive or restrictive method applied to a hinge joint. Similar to the previous elbow embodiment, there exists a wrist band 1101, which can be attached to the user. The components 1102 can be used together to vary the height and length at which the wrist band can be attached to the user without materially affecting or affecting the hinge joint system 1103. The hinge joint system 1103 will be described in additional detail in the following section that describes FIG. 21, in which the system uses hydraulic and/or friction forces to vary resistance or restriction on or around the main hinge joint. Components 1104 can be used together to vary the height and length in which the arm band 1105 can be attached to the body and allows for rotation and control from the main hinge. In addition to FIG. 11, there are two other perspectives of the system shown in FIG. 12 and FIG. 13 to provide further clarity to the system.

Another embodiment of the system comprises an object that is between two structures that provides at least one degree of freedom. The degree or multiple degrees of freedom can be controlled by resistance or restriction in order to prevent the user's motion along the degree of freedom that is intended to be altered or limited in some form.

Figure 14:
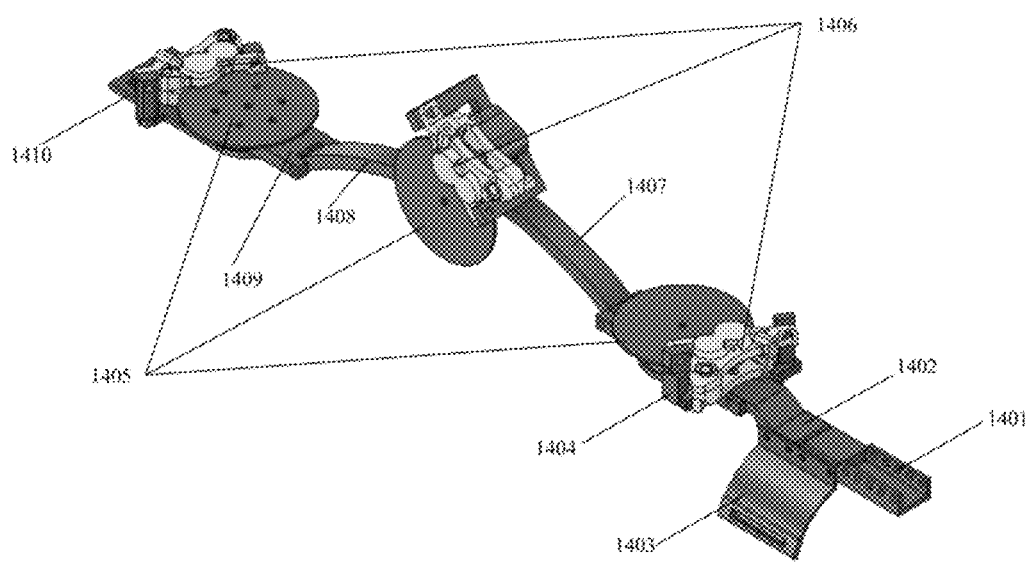
FIG. 14 is a perspective view of the triaxial joint that can be used for shoulder resistance or restriction with the exoskeleton frame for how it is attached to the person, according to one embodiment of the present invention. The triaxial design, in aspects, can be extrapolated or applied to the hip joint.
Figure 15:
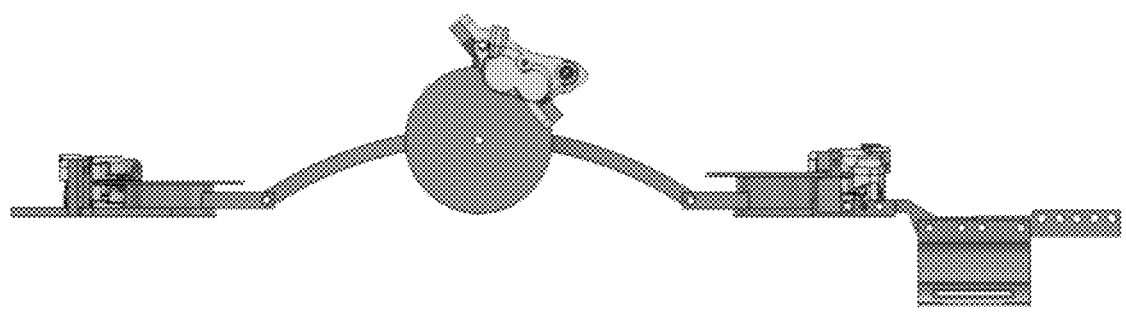
FIG. 15 is a side view of the triaxial joint that can be used for shoulder resistance or restriction with the exoskeleton frame for how it is attached to the person, according to one embodiment of the present invention. The triaxial design, in aspects, can be extrapolated or applied to the hip joint.
Figure 16:
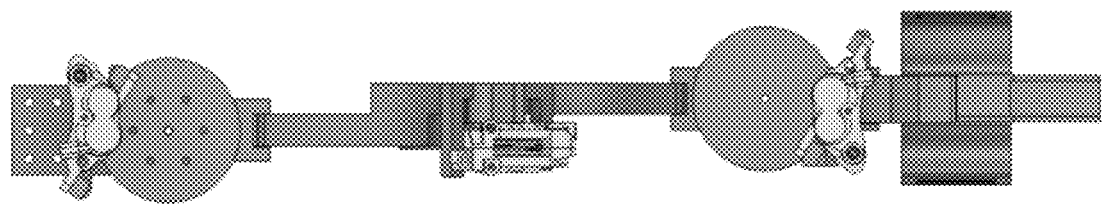
FIG. 16 is a top view of the triaxial joint that can be used for shoulder resistance or restriction with the exoskeleton frame for how it is attached to the person, according to one embodiment of the present invention. The triaxial design, in aspects, can be extrapolated or applied to the hip joint.

Another embodiment is the system shown in FIG. 14, in which the shoulder is used as a medium to describe the resistive or restrictive method for the triaxial joint. There are two additional perspectives of the joint shown in FIG. 15 and FIG. 16. The shoulder triaxial system begins the band component 1403 that can be used to attach onto a user's limb. Components 1401 and 1403 are transitional pieces from a previous system into the triaxial joint system. Component 1404 holds the caliper system 1406 described previously in regards to the hinge joint system that clamps down onto, in aspects, metal discs 1405, providing a variable frictional force upon a pivot point. Components 1407 and 1408 hinge with respect to one another due to and/or around the middle pivot point of the system. Component 1409 can allow for a pivot point and a hinge allowing for adjustability in the shoulder system, as well as control over another axis of rotation on either side of the triaxial system. Component 1410 can be used as a holder for the caliper system as well transition the triaxial system into another system. The triaxial joint system can provide restriction independently and simultaneously at different pivot point(s) and along each of the three axes of motion around a triaxial joint. Together this system can allow for three degrees of freedom around a joint and can provide restriction independently and simultaneously at different pivot point(s) and along each of the three axes of motion around a triaxial joint.

Figure 17:
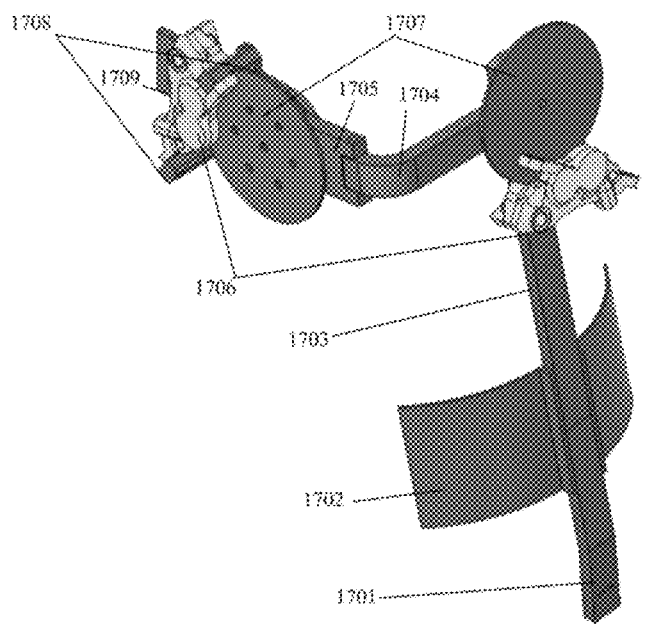
FIG. 17 is an outside perspective view of the triaxial joint that can be used for hip resistance or restriction with the exoskeleton frame for how it is attached to the person, according to one embodiment of the present invention. The triaxial design, in aspects, can be extrapolated or applied to the shoulder joint.
Figure 18:
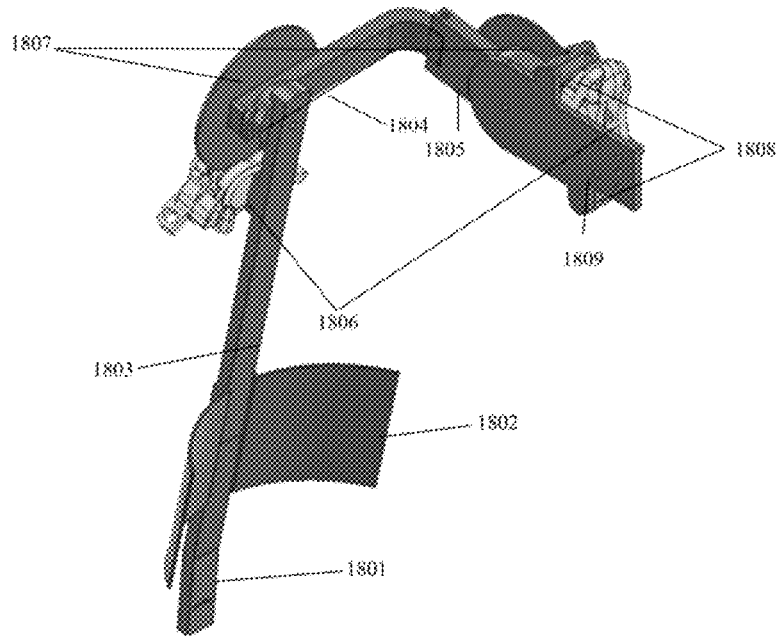
FIG. 18 is an inside perspective view of the triaxial joint that can be used for hip resistance or restriction with the exoskeleton frame for how it is attached to the person, according to one embodiment of the present invention. The triaxial design, in aspects, can be extrapolated or applied to the knee joint.

In another embodiment of the system, as shown e.g. in FIG. 17 and FIG. 18, the hip is used as a medium to describe the resistive or restrictive method for the triaxial joint. The system includes component 1701 that can be used as an extension to another system. The two holes, in examples, at the end of the component can also be used to adjust and/or connect the triaxial system to the next system depending on the curvature and shape of which and/or how the system is attached to the user's body by component 1702. The component 1703 extends from component 1702 and can be used as a hinge with component 1704. The pivot point formed by components 1703 and 1704 can be resisted using a resistive system comprising similar components 1706 and 1707 that have been previously described in the other related systems herein and are further described in additional detail herein. Another pivot point on a different axis of motion is formed by components 1704 and 1705. The pivot point formed can be controlled using one of the restriction methods described herein and can be adjusted to incorporate said systems and methods. Another degree of freedom is formed between components 1705 and 1709 and can be controlled like other pivot point(s) on the exoskeleton. Similar to previously described embodiments, the design can allow for three degrees of freedom around a joint and can provide restriction independently and simultaneously at different pivot point(s) and along each of the three axes of motion and/or rotation around a triaxial joint.

Another embodiment of the systems described herein is a system of nodes or linear mechanical parts that work in conjunction with one another to mirror and control a complex triaxial joint system on a user's body. The embodiment includes, in examples, two rotational pivot points with at least one degree of freedom on opposing ends of a linear displacement system. The linear displacement system may include components that allow for the two pivot points to travel or change in displacement towards and away from each other relative to one another. The overall system thereby allows for control over a joint with, in examples, at least three degrees of freedom in an interconnecting piece(s) assembled with multiple other individual components.

Another embodiment of the present invention is a finger and hand exoskeleton that uses a cabling system that is fed through a reel and rail system that travels along the body. In aspects, the cables in the system run through from the bottom of the fingers, back over the tops of the fingers, and then run through a series of housing units that keep the displacement of the cables minimal. The cables travel through the housing units and connect to a reel system that maintains a non-zero or near non-zero tension in the cables using a spring, for example. The cables are then restricted through an increasing frictional force at a location along the cabling system.

Another embodiment of the present invention is an exoskeleton for the upper body; for example, an exoskeleton that resists or restricts upper body motion. The use of multiple triaxial joints or hinge joints, in aspects, work in tandem to indirectly provide a frictional force between components that can restrict key parts or portions of the upper body from freely moving. The resistive and restriction system can be used to restrict the motions of the fingers, hands, elbows, shoulders, back, and/or hips. In embodiments, the hips are included in such a design due to the possibility that an upper body resistive or restrictive system may not work as intended since some upper body motions may work in tandem with hip motion. However, the hips could be excluded, thus allowing for other functionality and restriction of upper body motions.

An additional embodiment of the present invention is an exoskeleton for the lower body. This embodiment, in aspects, includes a frame and feedback system for resisting and restricting lower body motion. Points on the lower body include hips, knees, ankles, feet, and toes. The lower body exoskeleton can provide the necessary frictional force through the use of a scaled electromechanical system and frame that amplifies the size and power of the feedback system. The lower body of the exoskeleton also provides the option to connect to external hardware and devices to interface with and provide additional feedback and information.

Another embodiment of the present invention is for a human user's arm. In this embodiment, an exoskeleton can restrict either or both of a human user's arms using frictional forces between any combination of components that include a triaxial joint, hinge joint, frames, or feedback system that mirrors the degrees of freedom of the elbow, shoulder, wrist, or finger. The exoskeleton frame and joints are used in conjunction with an integrated feedback system to provide the necessary frictional forces needed to restrict or resist motions of the upper body.

In another embodiment of the present invention, the feedback system resists or restricts motion. This feedback system may indirectly provide a frictional force in or against the direction of motion of a user's body part. The frictional force is controlled through an electromechanical system that induces a normal force perpendicular to the frictional surface, in aspects. The increase of frictional force can be instant or variable since the power being sent to the electromechanical system is controlled by a central processor that sends commands directly to the system depending upon an input signal.

Figure 19:
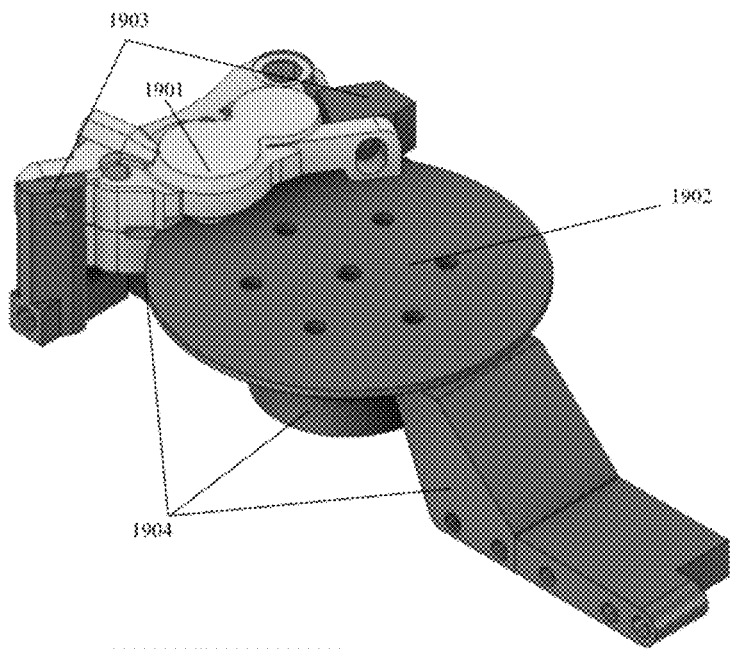
FIG. 19 is an isolated perspective view of the hinge joint with the feedback system that can be used for system resistance or restriction, according to one embodiment of the present invention.
Figure 20:
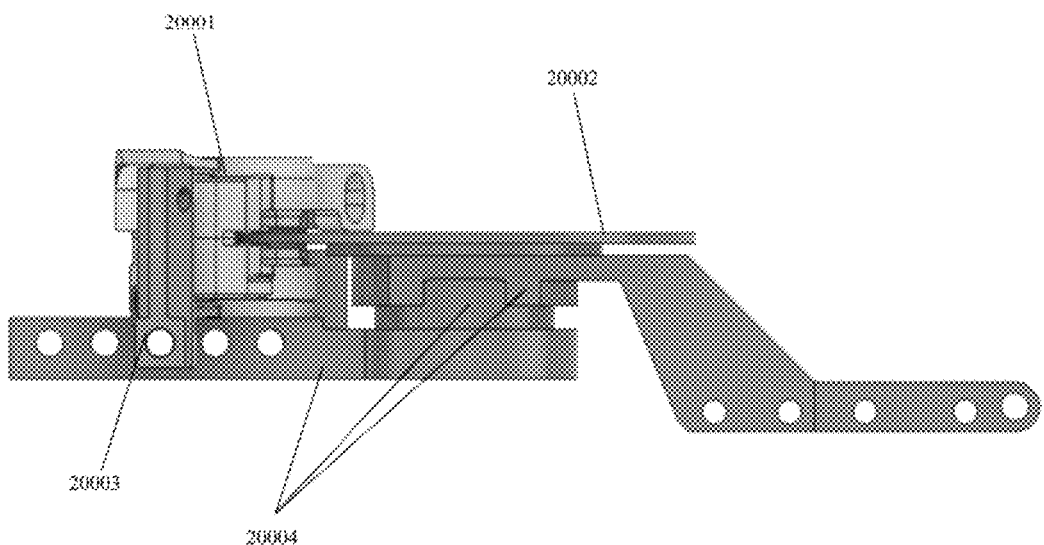
FIG. 20 is an isolated side view of the hinge joint with the feedback system that can be used for system resistance or restriction, according to one embodiment of the present invention.

In another embodiment of the feedback system, the system can be used to apply a frictional force as shown in FIG. 19, which in aspects can use a hydraulic brake caliper 1901 to provide a frictional force on a metal (or other material) disc 1902. The caliper and disc are on opposing sides of a hinge joint 1904. Fluidic material, gas, or air can be used to displace the pistons in the caliper to clamp down on the disc that can cause a variable resistive force on the hinge joint. The caliper can be attached to the exoskeleton using extension pieces 1903 that allow for screws (or other attachment mechanisms) to be inserted through or to the caliper, holding it in place. The disc can be similarly attached to the exoskeleton using screws (or other ways) that connect it through or to the hinge piece(s) and connect it to an upper component of the hinge 1904. Another perspective of the same system is shown in FIG. 20.

Figure 21:
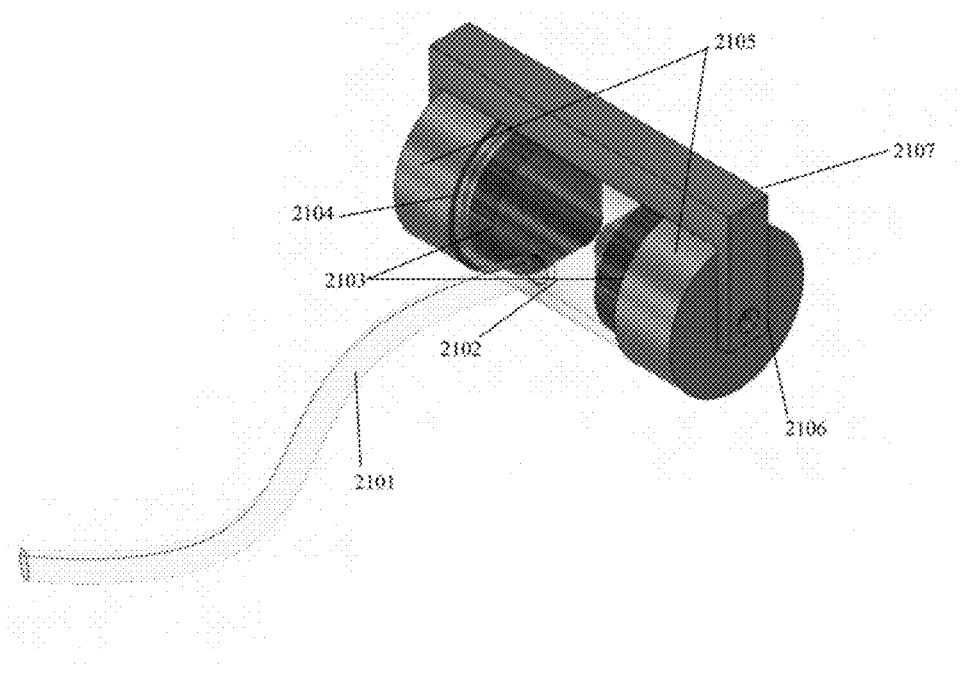
FIG. 21 is an isolated perspective view of the feedback system that uses outward piston compression that can be used for system resistance or restriction, according to one embodiment of the present invention.
Figure 22:
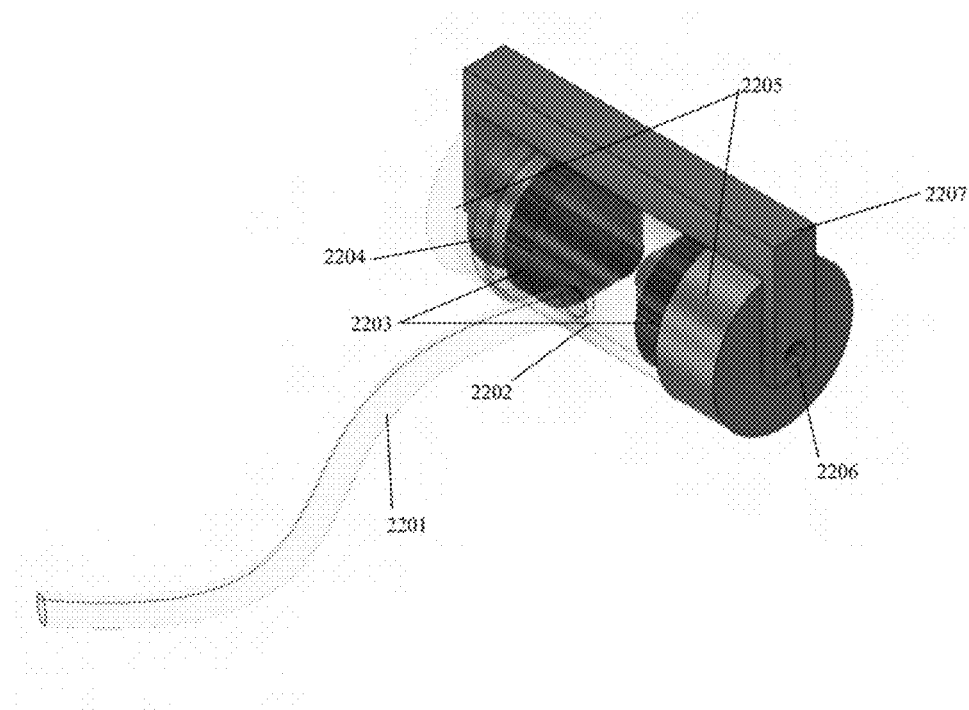
FIG. 22 is an isolated perspective view showing the inner mechanism of the feedback system that uses outward piston compression that can be used for system resistance or restriction, according to one embodiment of the present invention.
Figure 23:
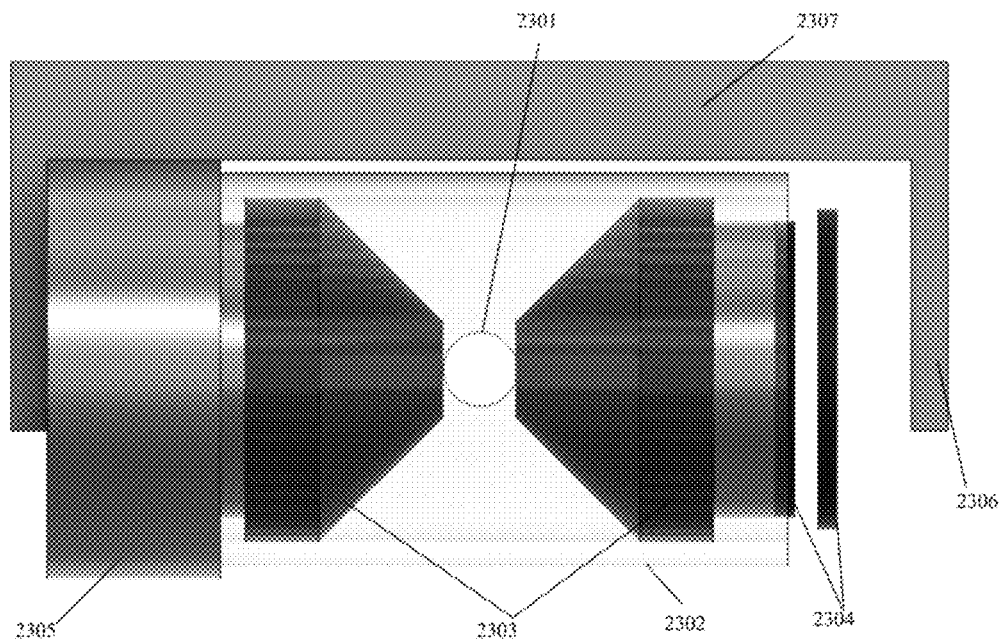
FIG. 23 is an isolated and zoomed in view showing the inner mechanism of the feedback system that uses outward piston compression that can be used for system resistance or restriction, according to one embodiment of the present invention.

In another embodiment, the feedback system can be used to apply a frictional force as shown in FIG. 21, for example, using a hydraulic force to displace two pistons onto a common pivot point with two independent rotating pieces on either side. Two additional perspectives with certain pieces made transparent are offered in FIGS. 22 and 23 that can provide additional clarification to the description of the invention, as well as FIG. 18. The system begins, in aspects, with a fluid being pumped in using a line, such as a tubular line, 2101 that moves additional fluid to the cavity of a seal body 2102. The fluid moving into the body will force a component labeled as 2103 to push outwards onto the rotational pieces 2105. The components 2103 that are pushing outwards compress two different materials connected to each opposing component causing a variable and controllable frictional force. The two rotational pieces 2105 pivot along the pivot point 2106. The rotational pieces can be contained using a component 2107 that bolts and clamps, in aspects, the pieces such that they cannot expand farther outwards. However, a component 2107 can allow one of the rotational pieces to move independently from it while the other rotational piece rotates with the component 2107. This system uses the movement of fluid, in aspects, to apply a frictional force on two rotating pieces that independently rotate with respect to each, but around the same pivot point.

Figure 24:
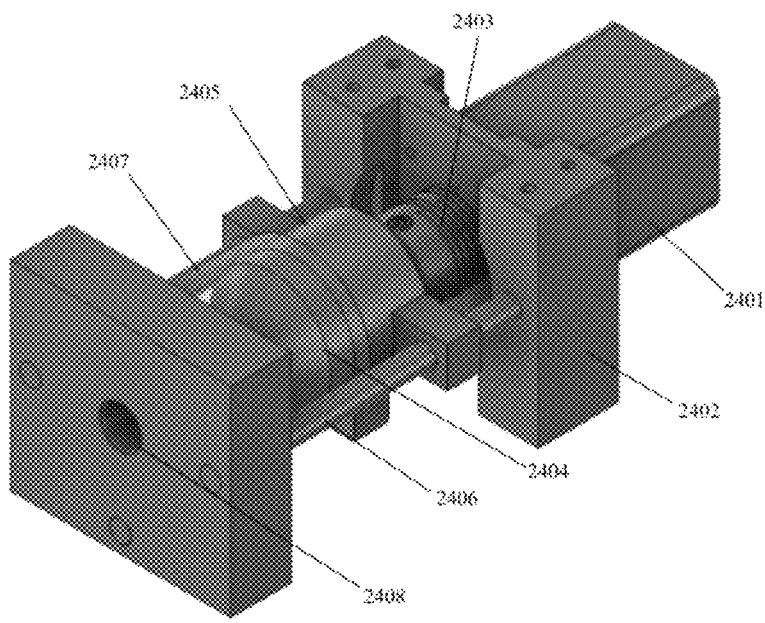
FIG. 24 is an isolated front perspective view of the feedback system that provides force which can be used for system resistance or restriction, according to one embodiment of the present invention.
Figure 25:
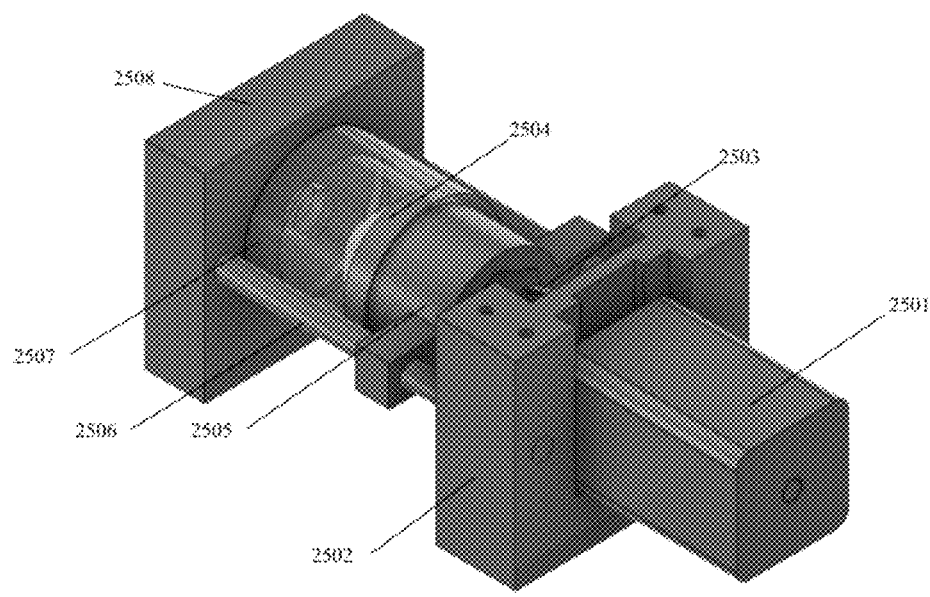
FIG. 25 is an isolated back perspective view of the feedback system that provides force which can be used for system resistance or restriction, according to one embodiment of the present invention.

In another embodiment of the feedback system, shown in FIG. 24, the system can be used with the exoskeleton to provide force to key components on the exoskeleton. The system includes an electromechanical system 2401 that is attached to a frame 2402. The frame is connected to a component 2408 by two or more rods 2406. A component 2405 slides along two rods 2406 by displacing linearly due to a driving force by the electromechanical system 2401. The electromechanical system drives a threaded rod within a coupler 2403 that can be used to displace the sliding piece 2405, with a sealing device 2404 attached onto it, and pump fluid through a body 2407. The fluid can then be pumped into a line exiting from the hole in component 2408. The fluid delivered by this physical feedback system can be used to generate a force using a mechanical mechanism to create a force on the point at which the feedback is necessary. The electromechanical system 2401 can be controlled using electronics, computer technology, and/or software that is configured to send signals, commands, and/or instructions to the system depending upon the program that is running on an electronic controller, or depending on an intended purpose or outcome for the system. The system can be attached and held together using set screws and adhesive, by way of example. Another perspective of the system is shown in FIG. 25.

Figure 26:
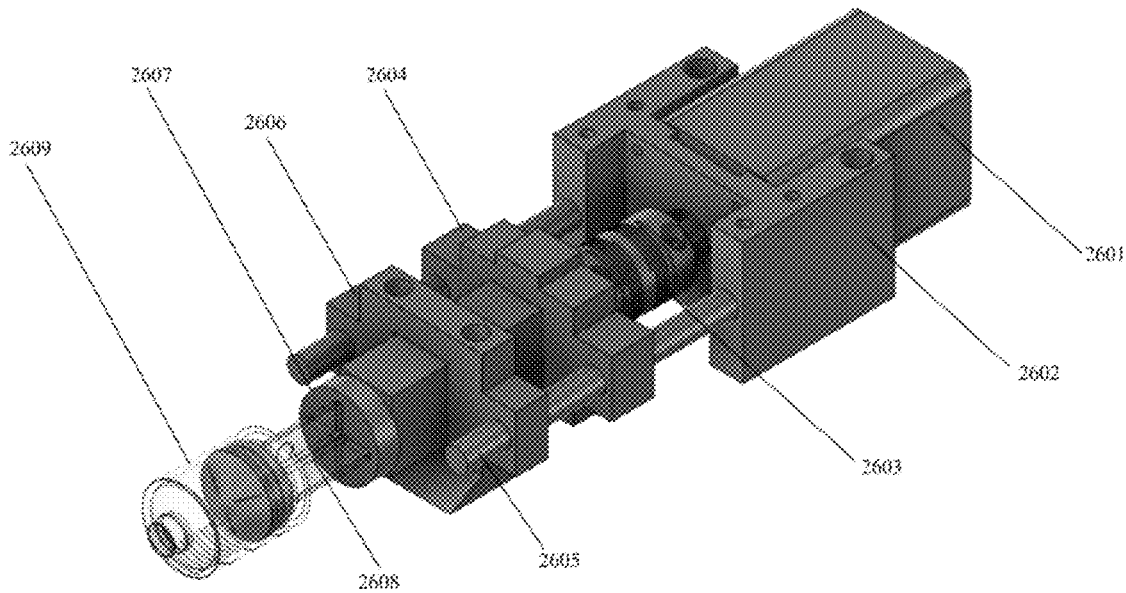
FIG. 26 is an isolated front perspective view of another embodiment of the feedback system that provides force which can be used for system resistance or restriction, according to one embodiment of the present invention.
Figure 27:
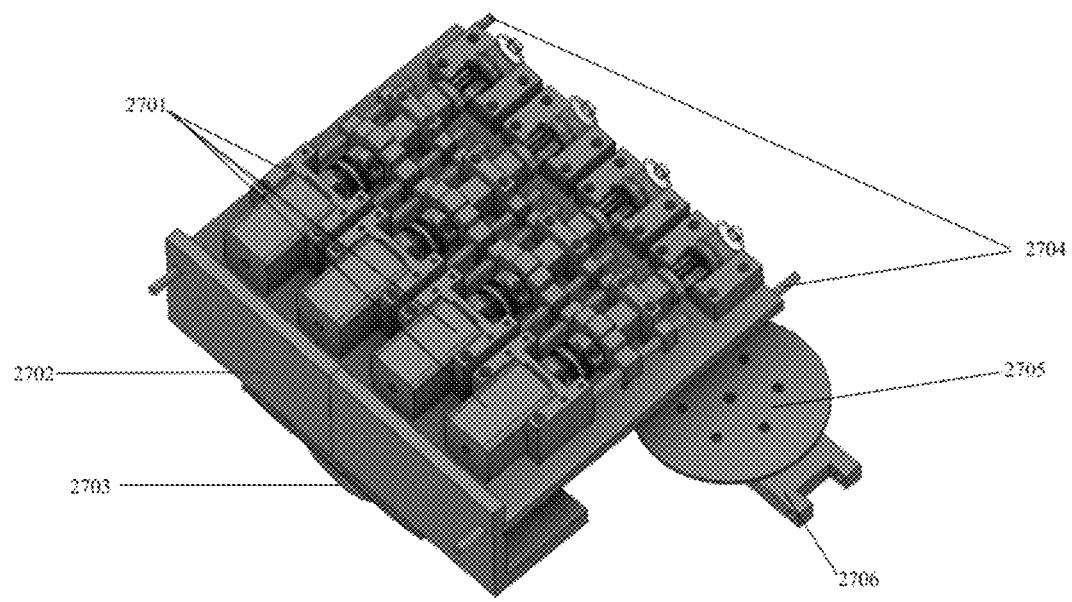
FIG. 27 is an isolated perspective view that contains the feedback systems discussed previously and other exoskeleton frame components necessary to attach the embodiment to the user/suit, according to one embodiment of the present invention.

In another embodiment of the feedback system, shown in FIG. 26, the system can be used with the exoskeleton to provide force to key components on the exoskeleton. The system includes an electromechanical system 2601 that is attached to a frame 2602. The frame is connected to a component 2606 by two or more rods 2605. A component 2604 slides along two rods 2605 by displacing linearly due to a driving force by the electromechanical system 2601. The electromechanical system drives a threaded rod within a coupler 2603 that can be used to displace a sliding piece 2605, with a sealing device 2608 and 2607 attached onto it and connecting the two pieces, and pump fluid through a body 2609. This system can then be attached to another system shown in FIG. 27, depicting a number of systems from FIG. 26 in parallel with 2701 on a carrying device system 2702. The system can be connected using two steel or other material rods 2704 that run through the carrying device, providing support and connectivity throughout the carrying device. Below the carrying device system a supporting component may provide support for the user's back torso and can be used to support the exoskeleton as a whole and distribute its weight across and away from the human body. Components 2705 and 2706 can be the transitioning pieces that begin the shoulder exoskeleton system mentioned previously.

Another embodiment of the present invention is a variable tightening system that controls the lengths and tensions of different cables and threads throughout the exoskeleton. The variable tightening system is a combination of a reel system and gear system that work in tandem to manage the cables and threads that are connected around the body. The system can be tightened either manually or automatically and can be released either manually or automatically.

Another embodiment of the present invention is a pneumatic or hydraulic system to be implemented with the physical feedback and tightening system. The system can be integrated throughout the exoskeleton providing forces to specified areas at key points along the invention's framework. The physical feedback system can also then be more compact and lighter, in comparison to a mechanical cable and housing system, by way of example only.

Another embodiment of the present invention is a physical feedback system that utilizes shape memory alloys or materials to replace key components in the exoskeleton frame in order to provide physical feedback in response to the user's motion. These shape memory alloys can be triggered using an indirect influence such as electricity, temperature, pressure, or magnetism, or a combination thereof. Implementing materials such as these can enable a more compact and lighter frame and physical feedback system.

Figure 28:
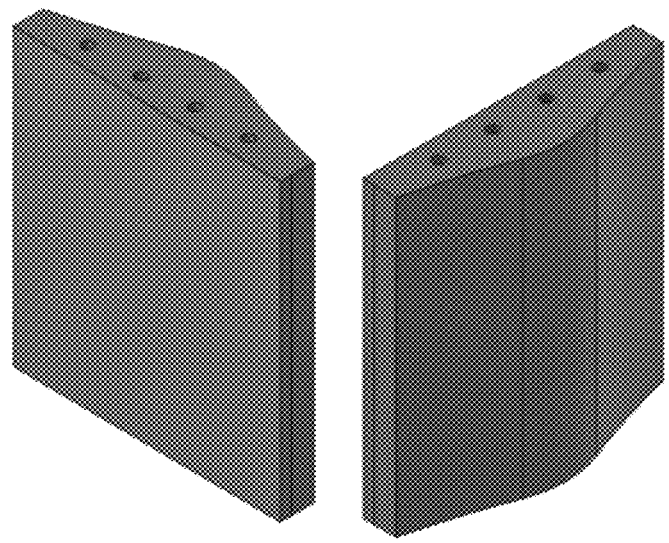
FIG. 28 is isolated perspective views of the spinal pieces that provide a multitude of features to the exoskeleton frame, according to one embodiment of the present invention.
Figure 29:
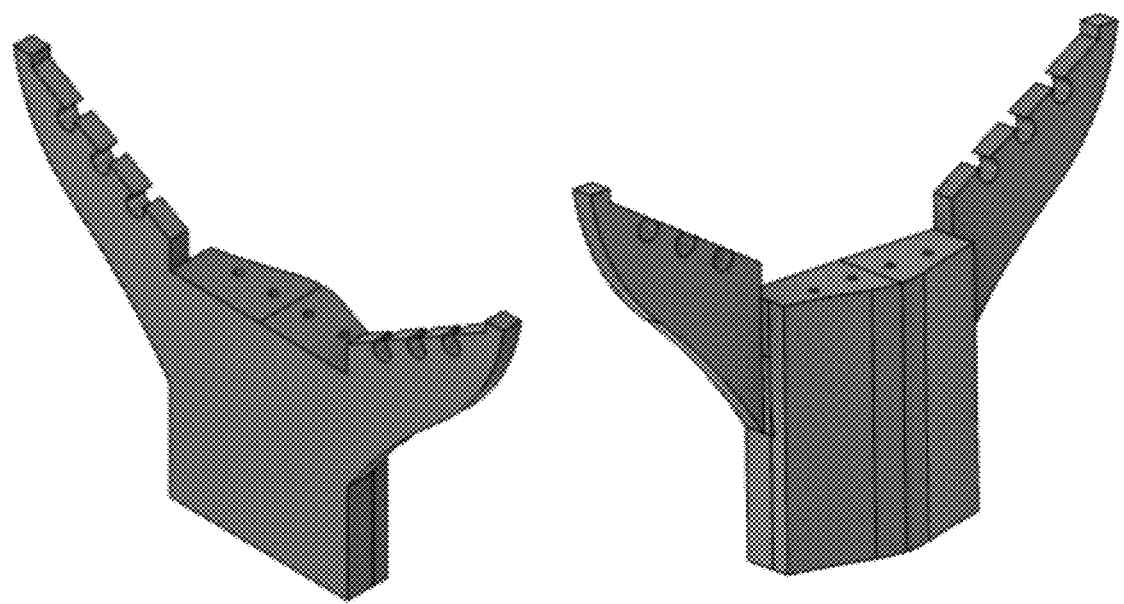
FIG. 29 is isolated perspective views of the spinal pieces with attachments that provide the ability to attach housing components to the exoskeleton frame, according to one embodiment of the present invention.

Another embodiment of the present invention is a spinal component shown in FIG. 28 that can be used to redirect force, provide support, and can be mounted with a carrying device. An array of these components can be combined in series to conform along the user's back and can be threaded through with cabling through holes in the apparatus or components. Another component or apparatus that can be used to assist mounting a back carrying device is shown in FIG. 29, which can include two additional pieces extending from one or more spinal pieces.

Another embodiment of the invention can include use of the present invention or pieces, parts, or portions of it for physical use by the user. Examples of this include, but are not limited to, physical training, physical therapy, exercise, or the monitoring and collection of user and exoskeleton data. The suit or its components can be used passively to monitor and collect data using sensors or computer interfaces, and the data collected can be analyzed either internally or externally.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. For example, instead of restrictive, resistive, and/or frictional forces to impede movement, the wearable exoskeleton may include mechanisms, such as levers, gears, pulleys, hydraulics, magnets, bendable materials, soft materials, soft robotics or any combination thereof, to enhance, support, or generally make movement easier or less burdensome for the wearer. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

"Soft materials" or "soft robotics" as used herein means highly compliant materials that can be used in the present invention and are understood by one or ordinary skill in the art. The "soft materials" or "soft robotics" as those terms are used herein further mean materials that are capable of changing properties, such as, by way of example, tensile strength, molecular structure, ultimate strength, elastic modulus, sheer modulus, oxidation, creep, conductivity, magnetism, and/or fracture toughness, upon external or internal stimulation through the use of temperature, electricity, pressure, or magnetism, for example. Any of the components or designs mentioned herein are capable of utilizing these "soft materials" or "soft robotics" to improve functionality and design. Literature articles describing "soft materials" or "soft robotics" include the following, which are hereby incorporated by reference herein in their entireties:

Miriyev, A., Stack, K. & Lipson, H., Soft material for soft actuators. *Nat Commun* 8, 596 (2017). https://doi.org/10.1038/s41467-017-00685-3 (see also, https://www.nature.com/articles/s41467-017-00685-3);

Ian W. Hamley, Introduction to Soft Matter: Synthetic and Biological Self-Assembling Materials, Revised edition, Wiley, 2007. ISBN 978-0-470-51610-2; and Website for Harvard Biodesign Lab, Soft Robotics, and associated papers (see https://biodesign.seas.harvard.edu/soft-robotics).

We claim:

1. A modular wearable electronic system comprising:
   a brake, piston, caliper, or any combination thereof, configured to automatically press against a disc, rotational mechanism, coupling piece, connecting piece, plate, cylinder, or any combination thereof, when activated, wherein the brake, piston, caliper, or any combination thereof apply frictional force to the disc, rotational mechanism, coupling piece, connecting piece, plate, cylinder, or any combination thereof, when activated, and wherein activating the brake, piston, caliper, or any combination thereof is capable of restricting or resisting a movement, flexing, swinging, or bending of one or more of a wearer's joints;
   a plurality of rigid or semi-rigid hinges, mechanical joints, bendable materials, soft materials, soft robotics, or combinations thereof, capable of being located at or near one or more of a wearer's joints;
   one or more processor capable of collecting and processing data received from or through the modular wearable electronic system, or received from one or more sensor connected to the modular wearable electronic system; and
   a wired or wireless network of one or more embedded system, the one or more sensor, or one or more transducer, capable of communicating with one another or with an external device or system;
   wherein, after the data is collected and processed, the restriction the resistance, or the frictional force is automatically changed or adjusted at or near one or more of the wearer's joints.

2. The modular wearable electronic system of claim 1, further comprising a lever, gear, hydraulic, or any combination thereof, that press against the disc, rotational mechanism, coupling piece, connecting piece, plate, cylinder, or any combination thereof, when activated, wherein the restriction, the resistance, or the frictional force are applied when the lever, gear, hydraulic, or any combination thereof that press against the disc, rotational mechanism, coupling piece, connecting piece, plate, cylinder, or any combination thereof, are activated.

3. The modular wearable electronic system of claim 1, wherein the modular wearable electronic system is capable of being divided into upper-body sections, lower-body sections, limb sections, or combinations thereof, and wherein the system will operate whether the sections are being used alone or in combination with one another.

4. The modular wearable electronic system of claim 1, wherein the modular wearable electronic system comprises sections for a wearer's upper-body, lower-body, and limbs.

5. The modular wearable electronic system of claim 1, wherein the modular wearable electronic system comprises a separate exoskeletal system or device for each of two or more portions of a wearer's body.

6. The modular wearable electronic system of claim 1, wherein the modular wearable electronic system is used in conjunction with and/or communicates with an augmented reality system, virtual reality system, mixed reality system, enhanced reality system, extended reality system, or a combination thereof.

7. The modular wearable electronic system of claim 1, wherein the modular wearable electronic system is combined with a haptic feedback system.

8. The modular wearable electronic system of claim 1, wherein the modular wearable electronic system is a part of a haptic feedback system.

9. The modular wearable electronic system of claim 1, wherein the modular wearable electronic system is portable.

10. The modular wearable electronic system of claim 1, wherein the embedded system is capable of mediating signals between a virtual reality environment, an augmented reality environment, a mixed reality environment, an enhanced reality environment, an extended reality environment, or a combination thereof, and a response or feedback from the modular wearable electronic system.

11. The modular wearable electronic system of claim 1, wherein the modular wearable electronic system interfaces with a virtual reality environment, an augmented reality environment, a mixed reality environment, an enhanced reality environment, an extended reality environment, or a combination thereof, for the purpose of providing a perception of touch and interactive feedback to the wearer wearing the modular wearable electronic system.

12. The modular wearable electronic system of claim 1, further comprising one or more controller, transmitter, receiver, circuit board, memory unit, communication device, battery or other power storage device, camera, gyroscope, accelerometer, antenna, or a combination thereof.

13. The modular wearable electronic system of claim 1, wherein the external device or system is one or more of a phone, computer, tablet computer, server, laptop computer, television, monitor, sensor, computer processing unit, Internet, local area network, wide area network-connected device, Bluetooth device, or a combination thereof.

14. The modular wearable electronic system of claim 1, wherein the one or more sensor is a force sensor, wherein the force sensor is capable of measuring and/or calculating forces applied to the one or more of the wearer's joints.

15. The modular wearable electronic system of claim 1, further comprising one or more accelerometer, gyroscope, or combination thereof, wherein the one or more accelerometer, gyroscope, or combination thereof are capable of tracking positions and rotation of the one or more of the wearer's joints or the modular wearable electronic system.

16. The modular wearable electronic system of claim 1, further comprising one or more electrodes, contact pad, or combination thereof, wherein the one or more electrodes, contact pad, or combination thereof are capable of sending and/or receiving signals to and from the wearer wearing the modular wearable electronic system, the modular wearable electronic system, the one or more of the wearer's joints, or a combination thereof.

17. The modular wearable electronic system of claim 1, further comprising a hydraulic or hydraulics.

18. The modular wearable electronic system of claim 1, wherein the data collecting and processing is autonomous and in substantially real-time.

19. The modular wearable electronic system of claim 1, wherein the automatic changes or adjustments to the restriction, the resistance, or the frictional force occur or are applied to the modular wearable electronic system in substantially real-time as the data is being collected and processed.

20. The modular wearable electronic system of claim 18, wherein the automatic changes or adjustments to the restriction, the resistance, or the frictional force occur or are applied to the modular wearable electronic system in substantially real-time as the data is being collected and processed.

* * * * *